United States Patent [19]

Nesbitt

[11] Patent Number: 5,569,477
[45] Date of Patent: Oct. 29, 1996

[54] CHEWING GUM CONTAINING VITAMINS OR OTHER ACTIVE MATERIALS

[75] Inventor: Regis J. Nesbitt, Ft. Thomas, Ky.

[73] Assignee: McCready Consumer Products, Inc., Ft. Thomas, Ky.

[21] Appl. No.: 431,288

[22] Filed: Apr. 28, 1995

[51] Int. Cl.⁶ .................................................. A23G 3/30
[52] U.S. Cl. .................. 426/5; 426/72; 426/74; 426/302; 426/311
[58] Field of Search ................. 426/3–6, 96, 302, 426/72, 74, 304, 310, 311

[56] References Cited

U.S. PATENT DOCUMENTS

| | | | |
|---|---|---|---|
| 3,011,949 | 12/1961 | Bilotti | 426/5 |
| 3,075,884 | 1/1963 | Bilotti et al. | 426/5 |
| 3,622,352 | 11/1971 | Daylor | 426/5 |
| 3,681,087 | 8/1972 | Johnson | 426/5 |
| 3,932,608 | 1/1976 | Anderson et al. | 424/54 |
| 3,992,519 | 11/1976 | Hofmann et al. | 424/48 |
| 4,127,677 | 11/1978 | Franczkowski et al. | 426/5 |
| 4,154,814 | 5/1979 | Hand et al. | 424/48 |
| 4,238,475 | 12/1980 | Witzel et al. | 424/48 |
| 4,238,510 | 12/1980 | Cherukuri et al. | 426/5 |
| 4,250,195 | 2/1981 | Cherukuri et al. | 426/5 |
| 4,254,149 | 3/1981 | Rudolph et al. | 426/5 |
| 4,352,823 | 10/1982 | Cherukuri et al. | 426/5 |
| 4,399,154 | 8/1983 | Puglia et al. | 426/5 |
| 4,882,175 | 11/1989 | Ream et al. | 426/5 |
| 4,914,135 | 4/1990 | Herschler | 514/711 |
| 5,059,416 | 10/1991 | Cherukuri et al. | 424/48 |
| 5,206,030 | 4/1993 | Wheatley et al. | 424/490 |
| 5,270,061 | 12/1993 | Reed et al. | 426/5 |
| 5,376,389 | 12/1994 | Reed et al. | 426/5 |

*Primary Examiner*—Jeanette Hunter
*Attorney, Agent, or Firm*—Oliff & Berridge

[57] ABSTRACT

A coated chewing gum includes a gum center containing a water-insoluble gum base and a first active material, and a shell coated around the gum center, with the shell containing a second active material. The coated chewing gum may be made by homogeneously dispersing a first active material in a gum base to form a gum mass; forming discrete masses of the gum mass; and coating the discrete masses with a coating composition containing a second active material.

20 Claims, No Drawings

CHEWING GUM CONTAINING VITAMINS OR OTHER ACTIVE MATERIALS

BACKGROUND OF THE INVENTION

The present invention relates to a coated chewing gum containing active materials such as prophylactic, nutritional or therapeutic substances including, for example, vitamins and minerals. More particularly, the present invention relates to a coated chewing gum such as a gumball comprising a gum center and an exposed outer shell wherein at least one active material is contained in the chewing gum core, and at least one other active material is contained in the coating (or outer shell).

Chewing gums in various forms such as slab, stick, tablet, block or ball shapes, and methods for producing the same, are known in the art. Conventional chewing gum generally includes a gum base to which is added water-soluble sweeteners, emulsifiers, mono- and di-glycerides, flavorings and colorants. For example, the water-soluble sweeteners typically include various sugars such as sucrose and dextrose, corn syrup, sorbitol and/or artificial sweeteners such as sodium or calcium saccharin, cyclamates and aspartame. A typical emulsifier for use in chewing gum is, for example, lecithin.

Chewing gums are generally prepared by melting a gum base in a kettle, mixing corn syrup or other softeners with the gum base, followed by adding solid sweeteners, flavorings, colorants and other additives. The chewing gum is then removed from the kettle, and formed into the desired shape. The result of such a process is typically a chewing gum product that is a continuous mass of gum base with the sweeteners, softeners, and other additives dispersed therein.

The use of a chewing gum product to deliver active materials, that is, using a gum base as a carrier for the active materials, is known in the art. For example, U.S. Pat. No. 4,238,475 to Witzel et al. discloses a chewing gum product capable of releasing finely divided water-insoluble therapeutic materials. The therapeutic components to be released from the chewing gum may comprise beneficial materials such as dicalcium phosphate, antacids, vitamins, drugs and the like. The disclosed chewing gum includes finely divided water-insoluble therapeutic materials coated with a water-soluble coating agent such as gum arabic so as to prevent resorption of the water-insoluble therapeutic material back into the gum base. The coated material is dispersed, along with a relatively water-insoluble phase comprising gum base, in a water-soluble phase comprising a softener, to form the chewing gum. The chewing gum may then be formed into such shapes as sticks, cubes, pillows and balls, and may optionally include a sugar or sugarless coating or shell. However, the outer coating or shell only provides additional flavor and/or sweetness to the chewing gum, protects the soft gum center and improves overall shelf-life of the gum; it does not include additional active materials.

U.S. Pat. No. 4,154,814 to Hand et al. discloses a therapeutic chewing gum comprising high concentrations of sodium and potassium salts in a critical ratio. The chewing gum composition comprises an insoluble gum base for use as a delivery vehicle for vitamins and the sodium and potassium salts. For example, it is described that such vitamins as ascorbic acid (Vitamin C), thiamine mononitrate (Vitamin B-1) and riboflavin (Vitamin B-2) may be added to the gum base.

Similarly, U.S. Pat. Nos. 3,011,949 and 3,075,884, both to Bilotti, disclose methods for promoting the release of active ingredients, such as dicalcium phosphate, powdered vitamins and antacid powders, from chewing gum. In the described processes, the individual solid particles of the active ingredients to be released from the chewing gum are coated with wet sugar and are then incorporated into a slab-shaped chewing gum.

U.S. Pat. No. 3,075,884 states that a practice of the prior art was to incorporate active ingredients into a hard candy shell, as opposed to the core, of a coated chewing gum. The active ingredients were incorporated into the shell because it had theretofore not been possible to incorporate them into the gum base while ensuring ready release of the active ingredients from the gum base. It states that the practice had been to deposit the active ingredients on the exterior of a gum nugget or center, usually with an underlying thin layer of sugar, and to coat the unit with a final layer of hard sugar. The product is referred to as "candy coated gum" and is described as releasing the active ingredients from the hard shell into the mouth before the active ingredients are chewed into the gum base. However, the method of incorporating active ingredients into the gum base as described in the patent rejects the hard candy shell in favor of the gum base as the preferred location of the active ingredients.

Presently, active materials such as vitamins and other nutritional and therapeutic substances are typically administered in the form of either a liquid or a chewable or non-chewable tablet, capsule or caplet. For example, in the case of vitamins, the vitamins are generally administered in the form of either a chewable, compressed tablet (typical of children's formulations) or in the form of a compressed, non-chewable tablet (typical for adult formulations). However, for a great number of children, for instance in the 2–4 and 4–12 year old age groups, vitamins in the form of chewable or non-chewable tablets may be either impractical or not preferred. For example, while many of the older children may have "outgrown" the chewable vitamin tablets currently on the market, they may still have difficulty swallowing the regular, larger-sized vitamin tablets that are intended for adults. Additionally, it is generally conceded by the medical profession that small, continued doses of active nutritional and therapeutic substances such as vitamins are of greater therapeutic and nutritional value than larger single doses. A multi-vitamin containing chewing gum may therefore address both the concerns of providing vitamins to children in a practical form, while simultaneously providing maximized therapeutic and nutritional effect.

Chewing gums are an answer, but the difficulty in producing effective and commercially desirable products has precluded the use of vitamin-containing chewing gums. While chewing gum products have been produced that contain one or several active ingredients, it has previously not been possible to include the desired multiple active materials into a chewing gum. The difficulties encountered include incorporating incompatible compounds into the same product, providing for effective (and especially cost effective) release of the active materials during chewing of the gum, and maintaining the texture and desirable characteristics of the gum.

Specifically, there has been a substantial difficulty in preparing vitamin-containing chewing gums that contain some or all of the desired active materials. Such difficulties include masking the undesired flavor of some of the active materials (such as minerals that have an unappealing taste). It has also been difficult incorporating multiple generally incompatible active materials into a gum base in a compatible manner without adversely altering the consistency and chewability of the chewing gum. In particular, it has been especially difficult to incorporate fat-soluble vitamins or other fat-soluble substances into general carrier compounds, much less into chewing gum. This is aggravated by the fact that chewing gums in particular, as carriers for active materials, pose the additional problem of decreasing the release level of the active materials from the chewing gum base.

SUMMARY OF THE INVENTION

A need continues to exist for improved chewing gums containing active materials. A need also continues to exist for a method of incorporating different active ingredients, such as minerals, water-soluble vitamins and fat-soluble vitamins, into the same chewing gum product such that they may be administered concurrently. Specifically, the need continues to exist for a feasible and practical means to incorporate a number of differing substances into a chewing gum product while maintaining the consistency, chewability and desirable flavor of the chewing gum. Such improved chewing gums, in the form of coated chewing gums or gumballs, and a method for their production, are provided by this invention.

Specifically, this invention provides a chewing gum comprising (a) a gum center comprising a water-insoluble gum base and a first active material and (b) a shell coated around said gum center, said shell comprising a second active material. This invention also provides a method for forming such a coated chewing gum, comprising homogeneously dispersing a first active material in a gum base to form a gum mass; forming discrete masses of said gum mass; and coating said discrete masses with a coating composition comprising a second active material thereby forming a coated chewing gum.

A distinct feature of the present invention is the separation of the plurality of active materials between the core and the shell of a coated chewing gum product, such as a gumball having a gum center and an exposed outer shell. Such separation ensures both desired release rates of the active materials into the system, while maintaining desirable consistency, chewability and flavor of the coated chewing gum product.

DETAILED DESCRIPTION OF PREFERRED EMBODIMENTS

In the present invention, the active materials are incorporated separately into a core or center of the coated chewing gum and into a shell, according to various physical and chemical properties of the substances. The present invention thereby groups the various active materials with each other and/or with the various chewing gum components to provide a consistent and desirable final product that releases a cost effective amount of the substances during chewing of the coated chewing gum product.

Herein, the term "active material" refers to the various prophylactic, nutritional and/or therapeutic substances that are to be incorporated into the coated chewing gum product, in the core and/or shell thereof. The term "active material" thus refers to powdered or finely divided water-insoluble or water-soluble materials that are capable of delivering nutritional or therapeutic effects via the oral cavity, including to the teeth and/or mucosa, as well as to the body in general through the walls of the oral cavity or through the digestive system. However, the term "active material" as used herein is meant to exclude the traditional and essential components of chewing gum. In particular, active material as used herein does not include gum base, sweeteners, elastomer solvents, gum base softening agents, plasticizers, detackifiers, lubricants, bulking agents, flavorants, and colorants. Such active materials may therefore include, but are not limited to, vitamins, minerals, nutritional supplements, antacids, antibiotics, cardiovascular drugs, enzymes, mixtures thereof and the like.

For example, vitamins and minerals that may be incorporated into the chewing gum of the present invention may include, but are not limited to, Vitamins A (in the form of, for example, palmitate or beta carotene), B-complex (such as B-1, B-2, B-6 and B-12), C, D, E and K; niacin; acid vitamins such as pantothenic acid and folic acid; biotin; minerals such as iron, calcium, magnesium, iodine, copper, phosphorus, zinc, manganese, potassium, chromium, molybdenum, selenium, nickel, tin, silicon, vanadium and boron; nutritional supplements such as fluorine and chlorine; and the like. Preferably, vitamins and minerals are included in such levels as to provide a significant dietary supplement, such as according to the U.S. Recommended Daily Allowance (US RDA). For example, in embodiments of the present invention, it is preferred that the coated chewing gum contains 100% or more of the US RDA (such as the U.S. RDA established by the U.S. Food and Drug Administration and revised in 1980) of some or all of the vitamins and minerals per dose (per piece or pieces of the coated chewing gum), although the level can be adjusted depending upon the specific active materials included and the recommended daily dosage of the coated chewing gum. The level may also, of course, be adjusted to account for active materials that do not have a specific recommended daily allowance, and for such other factors as dietary intake from other sources and active material interactions.

The coated chewing gum of the present invention may be formulated to release a cost effective amount of the active materials contained in the coating or shell once chewing has begun. The coated chewing gum of the present invention may also be formulated to release a cost effective amount, and preferably up to about 90 to about 95% or more, of the active materials contained in the gum center during the first five to ten minutes of chewing. Of course, the amount of active material present in the coated chewing gum will depend upon the nature and potency of the material, the required frequency of use, and its specific release properties from the chewing gum core or coating.

In the coated chewing gum of the present invention, the active materials are separated between the chewing gum core and the outer shell or coating, based upon chemical and physical properties of the active materials. However, depending upon the specific characteristics of a specific active material, it may be possible and even desirable to incorporate a portion of the specific active material into the chewing gum core and a second portion of the same active material into the coating. This separation may be preferable, for example, to provide a controlled and more prolonged release of the active material.

Generally, it has been found that the water-soluble active materials may appropriately be incorporated into the gum centers, whereas the acids and fat-soluble (or water-insoluble) active materials may appropriately be incorporated into the outer shell or coating of the coated chewing gum. The acids and fat-soluble active materials are generally incorporated into the outer coating or shell because they otherwise would tend to remain in the gum base, thereby preventing substantial absorption of the active materials during chewing of the gum. However, the general separation may be adjusted, for example, to account for release rates of a specific active material. The separation may also be made based on the amount of active materials to be incorporated into the core or shell, respectively. For example, because a smaller volume of active materials can be incorporated into the shell, it may be desirable or necessary to incorporate some of these active materials into the core, instead.

The amount of the gum base present in the gum centers will vary depending upon the specific coated chewing gum product being produced and the type of sweeteners present therein. The amount of gum base will also depend upon the desired consistency of the final product, as well as other components incorporated into the gum centers. In general, a gum base in the amount of from about 5% to about 85% by weight of the final chewing gum center composition (that is, excluding the outer shell or coating) is acceptable for use in the coated chewing gum compositions of the present invention. Preferably, the gum base should be present in an amount of from about 15% to about 75% by weight of the final gum center composition.

The gum base may be any water-insoluble gum base well known in the art. Illustrative examples of suitable polymers for gum bases include, but are not limited to, natural and synthetic elastomers and rubbers. For example, suitable polymers include, but are not limited to, substances of vegetable origin such as rubber latex solids, chicle, gelutong, nispero, rosidinha, pendare, perillo, niger gutta, tunu, gutta percha, and crown gum. Synthetic elastomers such as butadiene-styrene copolymers, isobutylene-isoprene copolymers, polyethylene, polyisobutylene, petroleum wax and polyvinyl acetate and mixtures thereof are also particularly useful in the gum base for gums of the present invention.

The gum base composition may also contain elastomer solvents to aid in softening the gum base. Such materials may include, but are not limited to, methyl, glycerol or pentaerythritol esters of rosins; methyl, glycerol or pentaerythritol esters of modified rosins, such as hydrogenated, dimerized or polymerized rosins; mixtures thereof and the like. Examples of such materials suitable for use in the gum base in the present invention include, but are not limited to, pentaerythritol esters of partially hydrogenated wood rosin, pentaerythritol esters of wood rosin, glycerol esters of partially dimerized rosin, glycerol esters of polymerized rosin, glycerol esters of tall oil rosin, glycerol esters of wood rosin or partially hydrogenated wood rosin, partially hydrogenated metal esters of rosin such as polymers of α-pinene or β-pinene, terpene resins including polyterpene, mixtures thereof and the like. These materials may generally be employed in an amount of from about 10% to about 75%, and preferably from about 45% to about 70%, by weight to the gum base.

A variety of traditional ingredients such as plasticizers or softeners, such as lanolin, stearic acid, sodium stearate, potassium stearate, glyceryl, triacetate, glycerine, natural waxes, petroleum waxes such as polyurethane waxes, paraffin waxes and microcrystalline waxes, may also be incorporated into the gum base to obtain a variety of desirable textures and consistency properties. When present, these individual additional materials are generally employed in amounts of up to about 15% by weight, and preferably in an amount of from about 3% to about 10% by weight, of the final gum base composition.

Other conventional ingredients that may be present in the gum base include a hydrophilic-type detackifier that will absorb saliva and become slippery. The hydrophilic type detackifier should preferably be incompatible with the elastomer and solvent for the elastomer, and may include such materials as polyvinyl acetate, polyvinyl butyl ether, copolymers of vinyl esters and vinyl ethers, mixtures thereof and the like.

The gum base may also include hard waxes that serve as lubricants, and that more preferably have a melting point of above about 65° C. and preferably above about 75° C. Examples of such hard waxes include candelilla wax, paraffin wax, carnauba wax, ozokerite, oricuri, microcrystalline wax and the like.

The gum base may also include a softening agent and/or lubricant that may comprise one or more hydrogenated vegetable or animal fats having a high melting point, that is above about 22° C.

The gum base may also include an emulsifier to impart hydrophilic properties to the gum base. The emulsifier causes saliva to be absorbed into the gum base, thereby making the gum base slippery. Examples of such emulsifiers may include, but are not limited to, glyceryl monostearate, phosphatides such as lecithin and sephalin, mixtures thereof and the like.

The gum base may also include particles of chalk or the like as a bulking agent and/or texturizer in amounts ranging from about 0 to about 75%, and preferably from about 0.2% to about 25%, by weight of the gum base. For the gum base to be employed in a substantially calorie-free gum, the gum base may include from about 32% to about 75%, and preferably from about 35% to about 70% by weight texturizing agent or inert filler. Examples of such texturizing agents or inert fillers suitable for use in gums of the present invention include, but are not limited to, calcium carbonate, aluminum hydroxide, alumina, magnesium carbonate, talc, aluminum silicates, mixtures thereof and the like.

Such gum bases are well known in the art, and may be modified to provide a variety of consistency, texture and other properties to the coated chewing gum product. Further examples and description of chewing gums in general, and the gum base in particular, may be found in U.S. Pat. No. 4,238,475 to Witzel et al. and U.S. Pat. No. 5,059,416 to Cherukuri et al., the entire disclosures of which are incorporated herein by reference.

The gum centers of the coated chewing gums of the present invention will also typically include sweeteners. Sweeteners that may be included in the chewing gum centers of the present invention are generally well known in the art, and include both natural and artificial sweeteners. For example, such sweeteners may include, but are not limited to, sugars such as sucrose, glucose (corn syrup), dextrose, invert sugar, fructose and the like; saccharine and its various compounds such as sodium saccharide and calcium saccharide; cyclamic acid and its various compounds such as sodium cyclamate; dipeptide sweeteners such as aspartame; dihydrochalcone compounds; glycyrrhizin; Stevia Rebaudiana (Stevioside); chloro derivatives of sucrose; dihydroflavinol; hydroxyguaiacol esters; L-amino dicarboxylic acid gem-diamines; L-amino dicarboxylic acid amino alkenoic acid ester amides; sugar alcohols such as sorbitol, sorbitol syrup, mannitol, xylitol; mixtures thereof and the like. Accordingly, the present invention may be used to provide what are traditionally referred to as "sugar-free" or "sugar-containing" coated chewing gums.

The coated chewing gum of the present invention may also incorporate flavoring agents to impart a desired flavor to the chewing gum. Generally, the flavorants will be incorporated into the gum centers; however, all or portions of the flavorants may also be incorporated in the coating or shell, to provide an initial amount of flavor to the chewing gum when it is first chewed. Suitable flavorants may, for example, be selected from natural and/or synthetic flavoring agents, such as flavoring liquids and/or liquid derived from plants, leaves, flowers, fruits, etc., and combinations thereof. Preferably, the flavorant component in the coated chewing gum of the present invention is selected from spearmint oil, cinnamon oil, oil of wintergreen (methylsalicylate) and peppermint oils. Also useful as the flavorant are artificial, natural or synthetic fruit flavors such as citrus oil including lemon, orange, lime and grapefruit and fruit essences including grape, apple, strawberry, cherry, pineapple and the like.

The amount of flavorant incorporated in the gum center is normally a matter of preference, subject to such factors as flavor type, gum base type and flavor strength desired. In general, amounts of from about 0.05% to about 3.0% by weight of the final gum center composition are suitable, with amounts of from about 0.3% to about 2.5% being preferred. Even more preferred, the coated chewing gum of the present invention includes from about 0.7% to about 2.0% flavorant by weight of the gum center.

The coated chewing gums of the present invention may also incorporate one or more colorants to provide a desired color to the chewing gum. When incorporated into the gum center of the coated chewing gum, the colorants are typically incorporated in amounts of up to about 1% by weight, and preferably up to about 0.06% by weight. Examples of colorants that may be incorporated into the coated chewing gum of the present invention are any of the dyes suitable for food, drug and cosmetic applications, such as FD&C dyes, and the like. Additionally, colorants may also be incorporated into the coating or shell to impart color thereto.

Coated chewing gums of the present invention may be formed by any of various chewing gum production methods such as those known in the art. A representative process for preparing a coated chewing gum composition including active materials according to the present invention is as follows; of course, the process may be adjusted as desired and other processes may be readily used.

First, the gum base is processed into a pelletized form by any of the known methods. The pelletized gum base is placed in a standard mixer equipped with a stirrer. An emulsifier for the gum base, if desired, is then added to the mixer and mixed in with the gum base. Next, sorbitol and glycerin are added to the mixer and are thoroughly mixed in with the gum base. Next, the flavorants, colorants, active materials, and any other additives are added to the mixture and incorporated into the gum base, and mixing is thereafter continued. Finally, the sweetener materials are added and mixed for an additional one to ten minutes or as necessary. The final chewing gum composition is then discharged from the mixer and formed into the chewing gum centers.

In the present invention, it is preferred that the temperature of the mixing process remain at or near room temperature. This is to prevent the active materials from undergoing reactions that may destroy the active materials or alter their effectiveness. Thus, in embodiments, the chewing gum components in the process of the present invention are not mixed with a melted gum base, as is standard practice for producing a chewing gum. Of course, depending upon the specific active material being incorporated into the chewing gum, the temperature of the mixing process may be increased to speed the mixing process, if desired.

Preferably, the gum centers are allowed to sit for several days prior to coating them with the outer shell. More preferably, the centers are allowed to sit for from about 1 to about 3 days; even more preferably for from about 24 to about 48 hours.

The outer shell may be applied to the gum centers by various coating techniques and methods such as those known in the art. In the present invention, the coating or shell contains one or more active materials, and additionally may contain sweeteners, flavorings, colorants and/or other conventional additives. In the final coated chewing gum product of the present invention, the shell preferably comprises from about 10 to about 20%, and more preferably from about 12% to about 15%, by weight of the final coated chewing gum product. The shell thus not only contains additional active materials, but also may provide additional flavor and sweetness to the coated chewing gum, protect the soft gum center, and improve the overall shelf-life of the coated chewing gum.

Based on the instant disclosure, one skilled in the art will recognize that the various components of the chewing gum discussed above may be selected and adjusted as necessary in order to achieve specific end products with desirable characteristics. The invention will now be described in more detail with reference to specific illustrative embodiments thereof. All parts and percentages are by weight unless otherwise indicated.

EXAMPLES

Example 1

A coated chewing gum containing active materials is produced according to the present invention, including a number of generally water-soluble vitamins incorporated into the gum centers, and a number of generally fat-soluble vitamins and acid vitamins incorporated into an exposed shell around the gum center.

Gum centers are produced by mixing 30 parts by weight of a standard gum base, 7.8 parts by weight of lycasin (a sugar-free corn syrup), one part by weight of a fruit flavoring, one part by weight glycerine, 0.5 parts by weight aspartame and 44.4 parts by weight crystalline sorbitol. To the gum base mixture is added 7.7 parts by weight vitamin C (in the form of sodium ascorbate) and 7.7 parts by weight of the following Vitamin Mixture 1:

| Vitamin Mixture 1 | | |
|---|---|---|
| Vitamin | Parts by Weight | Source |
| E | 27.8 | Dry 50% SD[1], 500 IU/gm |
| C | 31.2 | Sodium Ascorbate Fine Powder |
| Biotin (Vitamin H) | 2.1 | Bitrite 1% Trituration |
| Thiamine (Vitamin B-1) | 2.4 | Coated Mononitrate 33-⅓%[2] |
| Riboflavin (Vitamin B-2) | 2.4 | Coated 33-⅓% |
| Niacin | 28.0 | Coated niacinamide 33-⅓% |
| Vitamin B-6 | 3.4 | Coated pyridoxine 33-⅓%, 82% activity |
| Vitamin B-12 | 2.8 | 0.1% SD |

[1]SD indicates that the active material is spray-dried onto a conventional carrier material, with the percentage being the percent of active material by weight.
[2]Coated 33⅓% indicates that the active material is coated by a conventional material, with the active material being present in an amount of 33⅓% by weight.

All of the active materials used in this and the following Examples are used in their conventional, commercially-available form.

The gum centers are generally prepared by softening the gum base in a jacketed, tangential sigma blade mixer. Next, using a standard sugarless mixing procedure, sorbitol, maltitol syrup, flavoring and emulsifier are added and mixed into the softened gum base. A portion of the vitamins (Vitamin Mixture 1) is added and mixed into the gum base near the end of the mixing cycle. The gum base, Vitamin C and Vitamin Mixture 1 are thus mixed to provide a gum mass having a homogeneous consistency.

The gum mass is then extruded, for example through a gum extruder, to form hollow ropes or pencils. The hollow ropes or pencils are shaped into hollow gumballs by ball machines. The gumballs are then cooled, as necessary, to maintain their shape. The gumballs are formed into balls of the "asteroid gumball" size (approximately ¾ in. diameter). The balls ("gum centers") are allowed to sit for 24 hours before applying the shell coating.

The gumballs are coated with a shell according to conventional methods. A shell coating composition is formed by mixing sorbitol (syrup or powder), flavoring and colorants in a sufficient amount to cover the gum centers placed in a coating pan. To the shell coating composition is added the following Vitamin Mixture 2:

| Vitamin | Parts by Weight | Source |
|---|---|---|
| A | 54.9 | Dry palmitate, 25% SD |
| K | 2.7 | Dry phytonadione, 1% SD |
| D | 11.0 | Dry Vitamin D, 10% SD, 100,000 IU/gm |
| Folic Acid | 1.2 | 88% trituration[1] |
| Pantothenic Acid | 30.2 | dicalcium pantothenate, 91% SD |

Vitamin Mixture 2

[1]This is a conventional folic acid preparation containing 88% folic acid and 12% other materials.

The shell coating is applied to the gum centers by placing the gum centers in a coating pan, and applying the shell coating composition to the gum centers. The coating process is completed to produce a high sheen on the coated gumball. A wax polish, such as beeswax or carnauba wax or a mixture thereof is applied to the finished gumball. A coating of refined or confectioner's glaze may also be applied to protect the gumball from moisture. The coated gumballs are next dried and packaged. The result is a hard exposed shell formed around the individual gum centers.

The result is the production of coated gumballs containing vitamins in both the gum center and in the outer shell. Each gumball of this Example 1 contains 100% of the U.S. RDA of the specified eleven vitamins plus Vitamin K-1, biotin and extra Vitamin C. Testing shows that 90 to 95% of the vitamins are absorbed into the digestive system during the first five to ten minutes of chewing.

This Example also demonstrates the general separation of placing the water-soluble active materials in the core and the fat-soluble active materials in the shell. However, here the Vitamin E (a fat-soluble vitamin) is incorporated in the core because there is not enough room for it in the shell.

Example 2

Vitamin-containing gumballs are produced as in Example 1 above, except that Vitamin A in the form of beta carotene is incorporated into Vitamin Mixture 1 (the gum center), and no Vitamin A is included in the coating composition. Otherwise, the gumballs are produced using the same procedures and materials as specified in Example 1.

Although the gumballs produced in this Example 2 appear to provide stable products, the gumballs are in fact commercially unacceptable. Upon chewing, the gum product turns to mush very quickly. This effect is attributed to the incorporation of beta carotene (a fat-soluble vitamin) into the gum center. This Example demonstrates the difficulty encountered in forming desirable gumball products, and the reason for generally incorporating the water-soluble active materials in the gum core and the acid vitamins and fat-soluble active materials in the coating.

Example 3

Vitamin-containing gumballs are produced as in Example 1 above, except that the vitamin mixtures are adjusted to include iron in Vitamin Mixture 1 (to be incorporated into the gum center). The mixture is adjusted to include 100% of the U.S. RDA of iron (18 mg) per gumball. The gum center composition is also adjusted to remove the 7.7 parts by weight Vitamin C (in the form of sodium ascorbate); that is, Vitamin C is contained only in the Vitamin Mixture 1.

The gumballs are otherwise produced using the same procedures and materials as specified in Example 1. The result is gumballs similar to those in Example 1, except containing iron and having less Vitamin C. Testing shows that the gumballs possess good consistency, flavor and chewability, and release 90 to 95% of the active materials into the oral cavity and digestive system during the first five to ten minutes of chewing.

Example 4

Vitamin-containing gumballs are produced as in Example 1 above, except that the vitamin mixtures are adjusted to include eight additional minerals in the vitamin mixtures. The gum center composition is also adjusted to remove the 7.7 parts by weight Vitamin C (in the form of sodium ascorbate); that is, Vitamin C is contained only in the Vitamin Mixture 1.

The vitamin mixtures are adjusted to include effective amounts of iron, calcium, magnesium, iodine, copper, phosphorus, zinc, and manganese. All of these additional active materials are incorporated into Vitamin Mixture 1, to be incorporated into the gum center.

The gumballs are otherwise produced using the same procedures and materials as specified in Example 1. The result is gumballs similar to those in Example 1, except having less Vitamin C and additionally including the eight minerals described above. Testing shows that the gumballs possess good consistency, flavor and chewability, and release 90 to 95% of the active materials into the oral cavity and digestive system during the first five to ten minutes of chewing.

What is claimed is:

1. A chewing gum comprising:
   (a) a gum center comprising a water-insoluble gum base and a first active material that is water-soluble;
   (b) a shell coated around said gum center, said shell comprising a second active material that is fat-soluble and is different from said first active material,
   wherein said first and second active materials are selected from the group consisting of vitamins and minerals.

2. A chewing gum according to claim 1, wherein said first active material is water-soluble.

3. A chewing gum according to claim 1, wherein said second active material is fat-soluble.

4. A chewing gum according to claim 1, wherein said second active material is an acid.

5. A chewing gum according to claim 1, wherein said shell is an exposed shell comprising said second active material.

6. A chewing gum according to claim 1, wherein said first active material is selected from the group consisting of Vitamin E, Vitamin C, biotin, thiamine, riboflavin, niacin, Vitamin B-6 and Vitamin B-12.

7. A chewing gum according to claim 1, wherein said second active material is selected from the group consisting of Vitamin A, Vitamin K, Vitamin D, folic acid and pantothenic acid.

8. A chewing gum according to claim 1, wherein the first active material comprises a plurality of materials selected from the group consisting of Vitamin E, Vitamin C, biotin, thiamine, riboflavin, niacin, Vitamin B-6 and Vitamin B-12.

9. A chewing gum according to claim 1, wherein the second active material comprises a plurality of materials selected from the group consisting of Vitamin A, Vitamin K, Vitamin D, folic acid and pantothenic acid.

10. A chewing gum comprising a nutritionally effective amount of vitamins and minerals, said chewing gum comprising (a) a gum center comprising a gum base and a first portion of said vitamins and minerals, and (b) a shell coated around said gum center, said shell comprising a second portion of said vitamins and minerals, wherein said first portion of said vitamins and minerals comprises water-soluble vitamins and minerals, said second portion of said vitamins and minerals comprises fat-soluble vitamins and minerals, and said first portion of said vitamins and minerals contains at least one vitamin or mineral different from the vitamins and minerals of said second portion.

11. A chewing gum according to claim 10, wherein said vitamins and minerals are selected from the group consisting of Vitamin A, Vitamin D, Vitamin E, Vitamin C, folic acid, Vitamin B-1, Vitamin B-2, niacin, Vitamin B-6, Vitamin B-12, pantothenic acid and biotin 12. A chewing gum according to claim 10, wherein the vitamins and minerals of said first portion are different from the vitamins and minerals of said second portion.

13. A chewing gum according to claim 11, wherein said chewing gum comprises all of said vitamins and minerals.

14. A chewing gum according to claim 10, wherein said shell forms an exposed external layer on said gum center.

15. A chewing gum according to claim 11, further comprising a nutritionally effective amount of Vitamin K-1.

16. A chewing gum according to claim 11, further comprising a nutritionally effective amount of at least one additional mineral selected from the group consisting of iron, calcium, magnesium, iodine, copper, phosphorus, zinc, manganese, potassium, chloride, chromium, molybdenum, selenium, nickel, tin, silicon, vanadium and boron.

17. A chewing gum according to claim 16, wherein said chewing gum comprises a plurality of said additional minerals.

18. A method for forming a chewing gum as defined in claim 1, comprising:

(a) homogeneously dispersing a first active material in a gum base to form a gum mass;

(b) forming discrete masses of said gum mass; and (c) coating said discrete masses with a coating composition comprising a second active material thereby forming a coated chewing gum.

19. The method according to claim 18, wherein said coating step forms an exposed external layer around said discrete masses.

20. The method according to claim 18, wherein said first active material is water-soluble and said second active materials is fat-soluble.

* * * * *